Feb. 28, 1950      R. C. PIERCE      2,499,258
WIRE LAYING MACHINE
Filed May 5, 1947      2 Sheets-Sheet 1
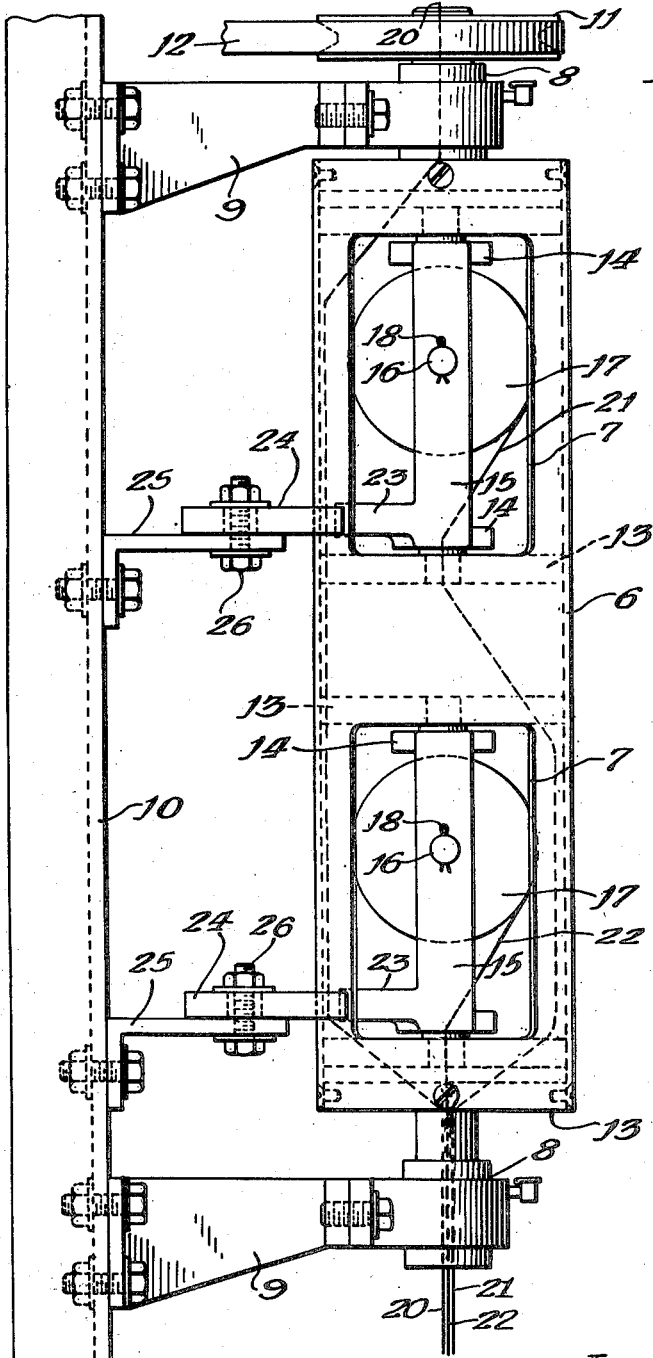
Inventor:
Robert C. Pierce
By Chritton, Schroeder, Merriam & Hofgren
Attorneys Feb. 28, 1950     R. C. PIERCE     2,499,258
WIRE LAYING MACHINE
Filed May 5, 1947     2 Sheets-Sheet 2
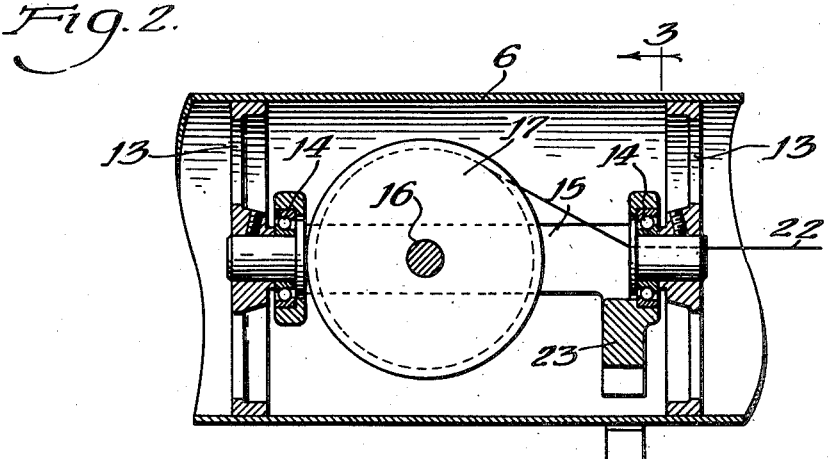
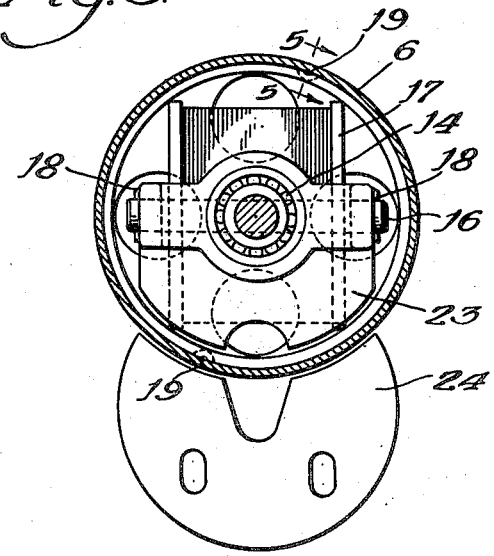
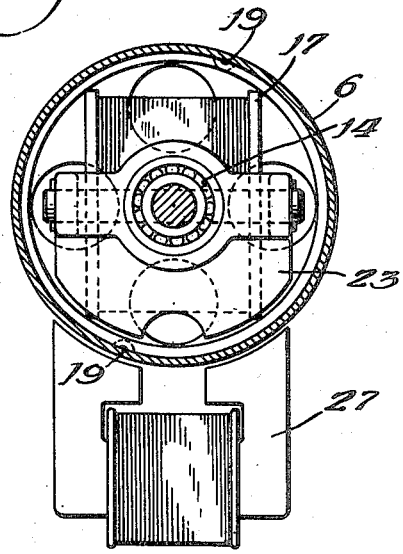
Inventor:
Robert C. Pierce Patented Feb. 28, 1950

2,499,258

UNITED STATES PATENT OFFICE 2,499,258

WIRE LAYING MACHINE

Robert C. Pierce, Niles, Mich., assignor to National-Standard Company, a corporation of Michigan Application May 5, 1947, Serial No. 745,913

2 Claims. (Cl. 57—59)

This invention relates to wire laying machines, and more particularly to the "skip" type of machine in which the wires are laid together to form a strand without being twisted individually.

Skip-type wire laying machines are well known and for many years have been used in making wire rope. In the conventional skip-type machine a horizontally disposed hollow rotor is driven at high speed. Cradles for carrying spools of wire are antifrictionally journalled in the rotor, and the center of the spool is disposed below the axis of the rotor so that the cradle is maintained against rotation by the action of gravity. Some machines have a large number of cradles and require a great deal of floor space. The horizontal arrangement has heretofore been thought necessary, to enable the force of gravity to prevent rotation of the cradles.

The primary object of the present invention is to provide magnetic means for restraining rotation of the cradles, so that the rotor may be arranged with its axis in upright or inclined position, if desired.

Another object of the invention is to provide a machine in which the axes of the spools lie in substantially the same plane as the axes of the rotor and cradles.

The invention is illustrated in a preferred embodiment in the accompanying drawings in which:

Figure 1 is an elevational view showing one form of the improved wire laying machine; Fig. 2, a fragmentary longitudinal sectional view of the rotor, one cradle and the magnetic holding device; Fig. 3, a sectional view, taken as indicated at line 3—3 of Fig. 2; Fig. 4, a view similar to Fig. 3, in which an electro-magnet has been substituted for a permanent magnet; and Fig. 5, an enlarged fragmentary sectional view, taken as indicated at line 5—5 of Fig. 3.

In the embodiment illustrated, a rotor 6, in the form of a hollow cylinder, made of brass or other non-magnetic material, has large hand openings 7, to permit access to the spools. The rotor is antifrictionally journalled in thrust bearings 8 secured to brackets 9 which are bolted to an upright frame 10. The rotor is provided with hollow shafts defining wire passageway means and the upper shaft has a pulley 11, driven by a belt 12 from a motor, not shown. As best shown in Fig. 2, the rotor is provided at intervals with heads 13 which afford antifriction bearings 14 for cradles 15.

The cradles have lateral openings to receive the shafts 16 on which spools 17 are mounted. The shafts 16 may be loosely held in the cradles by means of cotter pins 18, as shown in Figs. 1 and 3. The head 13 is provided with diametrically opposed longitudinal openings 28 defining guide means, one of which is shown in detail in Figure 5, and these openings or guide means, as illustrated in Figures 3 and 5, have "Carboloy" (an alloy of tungsten, carbon and cobalt) inserts 19 mounted therein to provide good wearing surfaces for wire passing therethrough. It will be understood that one wire 20 from a supply source disposed remotely from the rotor, and above the rotor in the embodiment of my invention herein disclosed, may be led in through the top hollow shaft of the rotor and led around the cradles by being threaded through the heads 13 close to the inner wall of the rotor and then back through the lower hollow shaft of the rotor into wire laying position. In like manner, wire 21 may be led from a coil of wire carried by the spool in the top cradle so as to travel around the lower cradle, and wire 22 may be led from a coil of wire carried by the spool in the lower cradle to wire laying position.

Each of the cradles is shown with a magnetic portion 23, which may be in the form of a permanent horse-shoe magnet which extends close to the inner wall of the rotor, as shown in Figs. 1, 2 and 3. Outside of the rotor, in close proximity to each of the magnetic portions 23 of the cradles, is provided a powerful permanent magnet 24 which may be bolted to a non-magnetic bracket 25 by means of bolts 26. Thus, a magnetic circuit is established through the wall of the rotor between the magnets 23 and 24, and this force has been found to be sufficient to prevent rotation of the cradles when the rotor is driven at several thousand revolutions per minute.

In the modification shown in Fig. 4, electromagnets 27 have been substituted for the permanent horse-shoe magnet shown in the other view. The electro-magnet performs the same function as a permanent magnet and prevents rotation of the adjacent cradle.

The foregoing detailed description is given for clearness of understanding only, and no unnecessary limitations should be understood therefrom, for some modifications will be obvious to those skilled in the art.

I claim:

1. A wire laying machine comprising a frame, bearing bracket means supported by said frame, rotor means having shaft means journalled in said bearing bracket means for supporting said rotor means for rotation about a vertical axis, said shaft means having wire passageway means therein, spool cradle means journalled in said rotor means coaxially of the vertical axis of the latter, said spool cradle means providing for the support of a spool carrying a first coil of wire, guide means for said rotor means for guiding a second wire from a source disposed remotely from said rotor means in a substantially cylindrical path lying outwardly of the periphery of said spool cradle means, said first and second wires being adapted to pass through the wire passageway means of said shaft means to provide for laying of said wires together at the exit end of said wire passageway means, and means for restraining rotation of said spool cradle means with said rotor means comprising, a first magnet secured to said cradle means to lie in a horizontal plane intermediate the ends of the cylindrical path of rotation of said second wire, said first magnet having the pole faces thereof lying immediately inwardly of the cylindrical path of rotation of said second wire, and a second stationary magnet supported by said frame in aligned horizontal relationship with said first magnet for cooperation therewith to establish a magnetic circuit therebetween, said second magnet having the pole faces thereof disposed to provide a narrow gap for the magnetic circuit between said magnets outwardly of the periphery of said rotor means and with the gap lying in the cylindrical path of travel of said second wire.

2. The wire laying machine of claim 1 characterized by the provision of a second spool carrying a coil of wire arranged in tandem relation with said first spool, and second guide means for said rotor means for guiding the third wire from said second spool in the cylindrical path outwardly of said cradle means.

ROBERT C. PIERCE.

REFERENCES CITED

The following references are of record in the file of this patent:

UNITED STATES PATENTS

| Number | Name | Date |
|---|---|---|
| 15,326 | Boone | July 15, 1856 |
| 801,613 | Schuler | Oct. 10, 1905 |
| 1,073,052 | Larmuth | Sept. 9, 1913 |
| 1,480,207 | Holmberg, Jr. | Jan. 8, 1924 |
| 1,609,455 | Boe | Dec. 7, 1926 |
| 2,125,823 | Stoddard | Aug. 2, 1938 |
| 2,179,247 | Arnold, Jr. | Nov. 7, 1939 |
| 2,374,085 | Gwaltney et al. | Apr. 17, 1945 |
| 2,416,126 | Somerville | Feb. 18, 1947 |